United States Patent [19]

Wenstrom et al.

[11] 4,124,920
[45] Nov. 14, 1978

[54] METHOD FOR SEPARATING EDIBLE CRAB MEAT FROM NON-EDIBLE PORTIONS OF COOKED CRABS

[75] Inventors: Richard T. Wenstrom, Hampton, Va.; Theodore S. Reinke, Rehoboth Beach, Del.; Calvert B. Tolley, Wingate; J. Clayton Brooks, Cambridge, both of Md.

[73] Assignee: Sea Savory, Inc., Cambridge, Md.

[21] Appl. No.: 737,088

[22] Filed: Oct. 29, 1976

Related U.S. Application Data

[60] Division of Ser. No. 643,706, Dec. 23, 1975, Pat. No. 4,003,103, and a continuation-in-part of Ser. No. 457,554, Apr. 3, 1974, abandoned.

[51] Int. Cl.$^2$ ............................................. A22C 29/00
[52] U.S. Cl. ........................................ 17/48; 209/266
[58] Field of Search ............... 17/71, 46, 48; 209/263, 209/264, 266, 267

[56] References Cited

U.S. PATENT DOCUMENTS

| 1,051,158 | 1/1913 | Owens | 209/263 |
|---|---|---|---|
| 1,356,043 | 10/1920 | Cowan | 209/266 |
| 1,840,917 | 1/1932 | Ross | 209/266 |
| 1,981,081 | 11/1934 | Simpson | 209/267 |
| 2,734,537 | 2/1956 | Geisler | 17/56 |
| 2,948,437 | 8/1960 | Nielsen | 222/196 |
| 3,261,508 | 7/1966 | Wahl | 222/199 |
| 3,365,059 | 1/1968 | Hobbs | 209/266 |
| 3,372,723 | 3/1968 | Elich | 17/56 |
| 3,375,547 | 4/1968 | Reinke | 17/71 |
| 3,396,768 | 8/1968 | Kurihara | 17/56 |
| 3,855,668 | 12/1974 | Wenstrom | 17/71 |
| 4,003,103 | 1/1977 | Wenstrom et al. | 17/71 |

Primary Examiner—Russell R. Kinsey
Assistant Examiner—Paul J. Hirsch
Attorney, Agent, or Firm—Scrivener, Parker, Scrivener & Clarke

[57] ABSTRACT

Apparatus and method for vibrating edible crab meat from the core portion of a crab body that has been de-shelled, de-legged and de-fingered and the central core portion of which has been cleaned. The crab body is supported in a core box with the body cavity directed downwardly opposite a discharge opening formed in the bottom of the core box, whereupon the core box is vibrated at about 1500 to 5000 vibrations per minute to shake the crab meat from the core and to deposit the meat particles on an endless conveyor that travels therebeneath. Preferably the core box bottom contains a plurality of pockets having walls converging toward the discharge openings, the crab cores being held in place by suitable cushion means.

2 Claims, 10 Drawing Figures

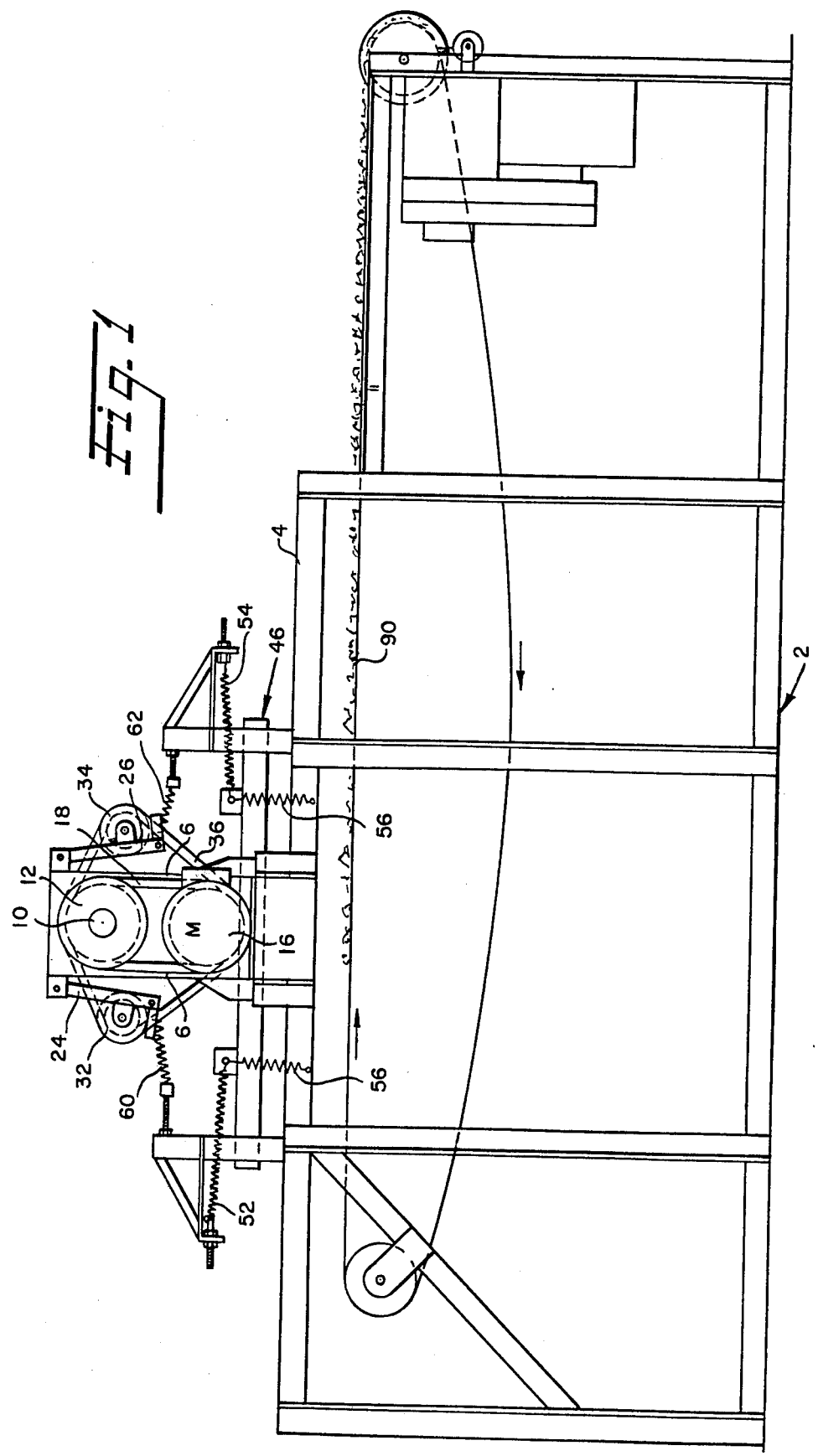

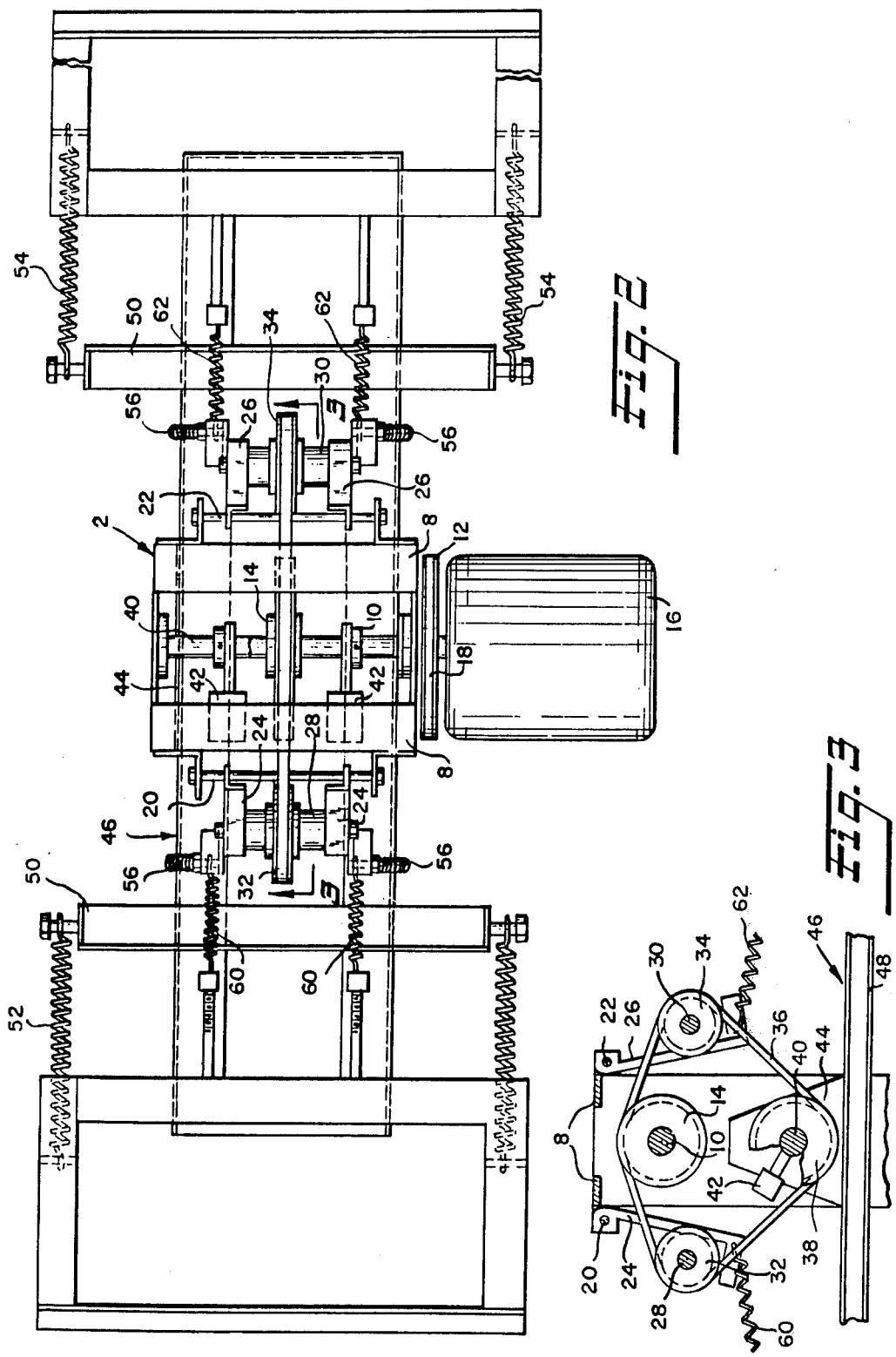

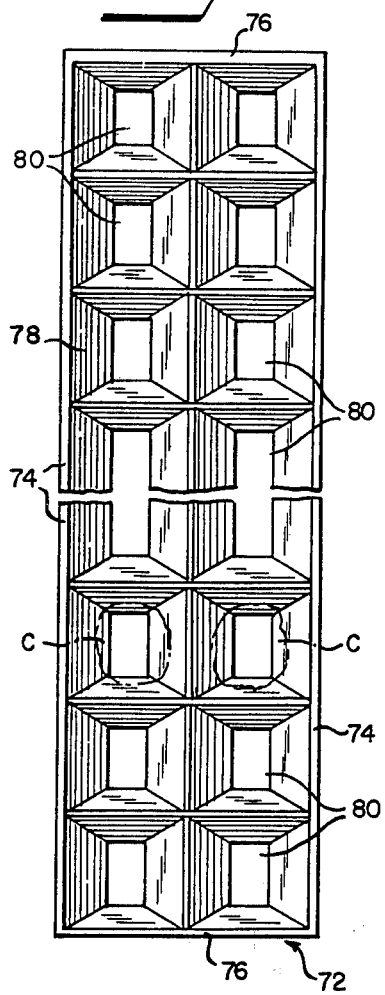
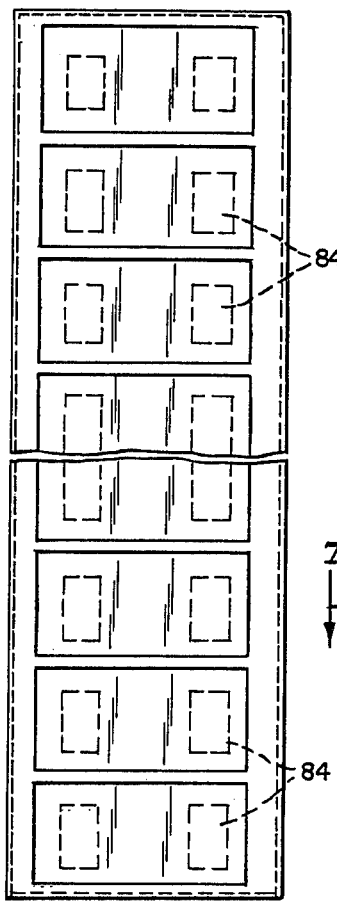
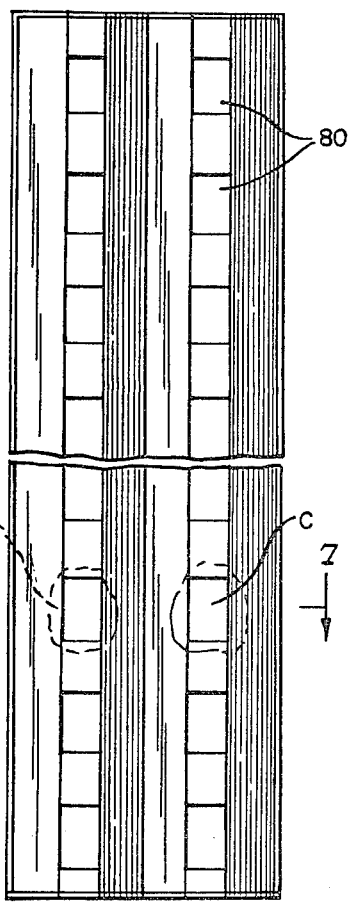
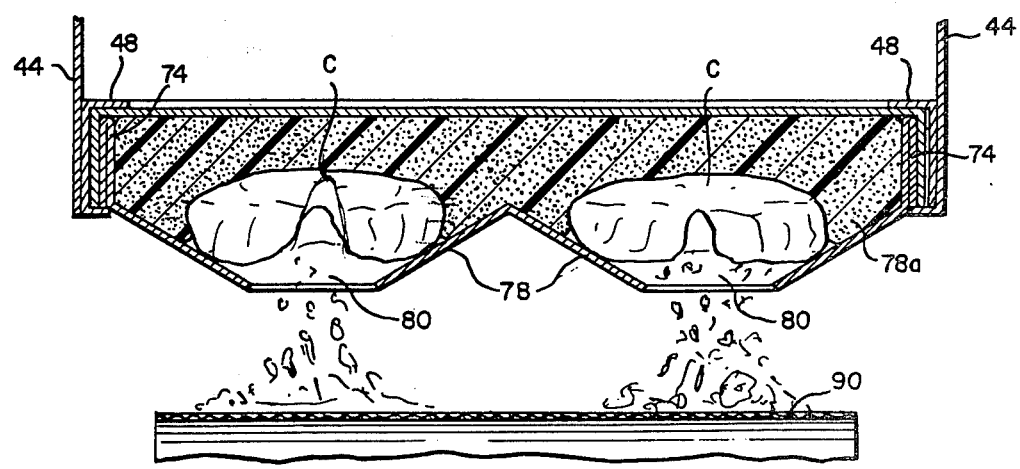

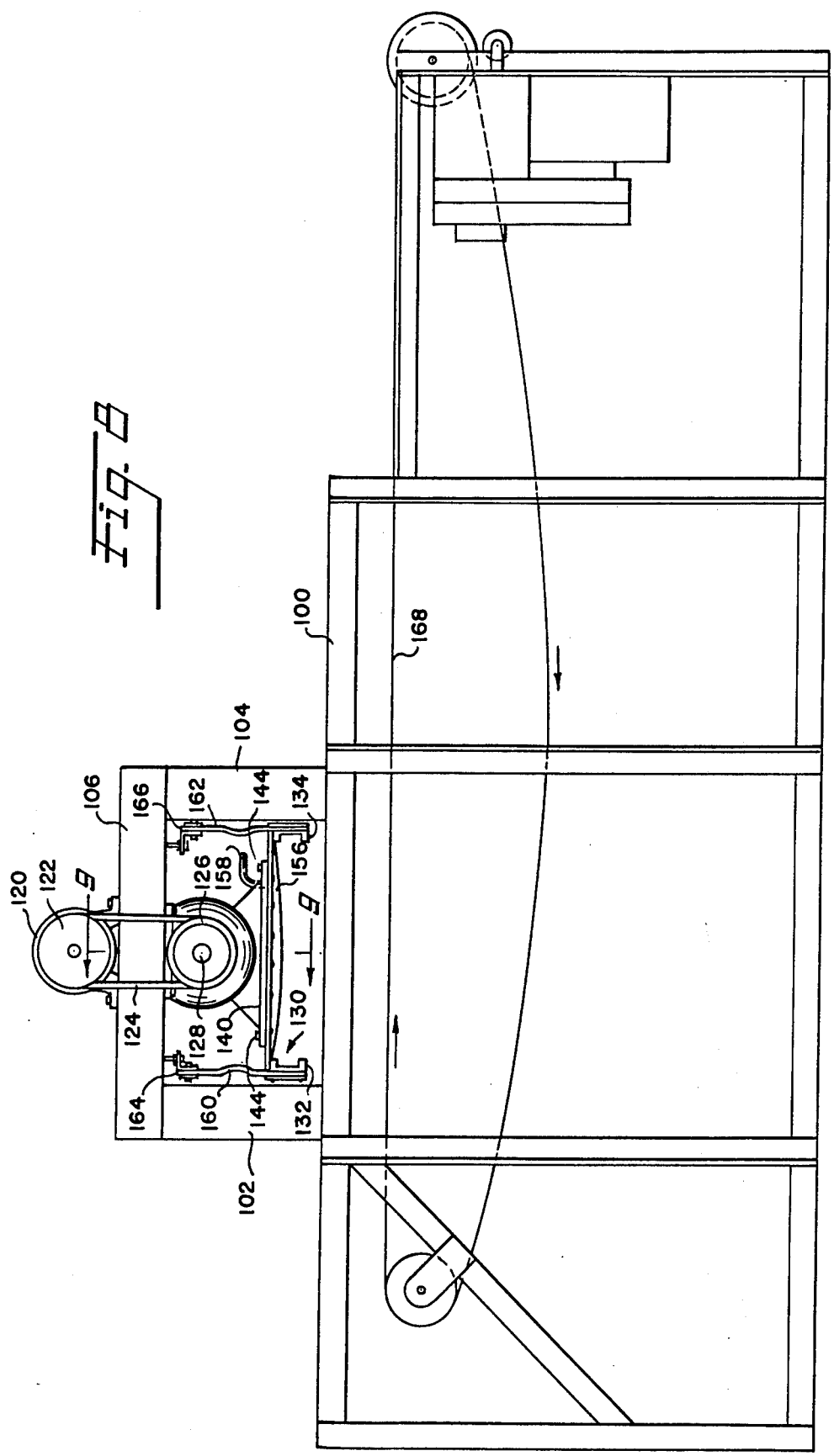

4,124,920

METHOD FOR SEPARATING EDIBLE CRAB MEAT FROM NON-EDIBLE PORTIONS OF COOKED CRABS

This is a division of our application Ser. No. 643,706 filed Dec. 23, 1975 now U.S. Pat. No. 4,003,103 and is a continuation-in-part of application Ser. No. 457,554 filed Apr. 3, 1974, now abandoned.

Various proposals have been presented for mechanically removing edible crab meat from the core portions of crab bodies that have been cooked, de-shelled, de-legged and de-fingered. Among the prior suggestions are vacuum removal, shock removal, screening of meat particles from disintegrated crab bodies, centrifugal separation of particles, shaking of the crab bodies, and the like.

The present invention relates to crab processing apparatus of the vibratory type for removing edible crab means from cooked crab bodies.

Accordingly, a primary object of the present invention is to provide vibratory crab processing apparatus including a core box for supporting in an inverted position over a discharge opening in the bottom of the core box the core portion of a crab body that has been cooked, de-shelled, de-legged and de-fingered, and the central cavity of which has been cleaned, and means for vibrating said core box from between 1500 to 5000 vibrations per minute.

According to a more specific object of the invention, the bottom of the core box includes pockets that have walls which converge toward the discharge openings, the crab cores being pressed downwardly in the pockets with the cleaned cavities facing the discharge openings by means such as an air cushion or resilient pads that are compressed by the cover member of the core box assembly.

A further object of the invention is to provide a core box holder that is resiliently supported for vertical and longitudinal movement relative to the stationary frame of the apparatus, said holder including channel means for removably receiving the core box assembly. Eccentric means are provided for vibrating the core box holder and, consequently, the core box supported thereby.

Other objects and advantages of the invention will become apparent from a study of the following specification when viewed in the light of the accompanying drawings, in which:

FIG. 1 is a side elevation view of one embodiment of the vibratory crab body processing apparatus of the present invention;

FIG. 2 is a top plan view of the apparatus of FIG. 1;

FIG. 3 is a detailed sectional view taken along line 3—3 of FIG. 2;

FIG. 4 is a top plan view of the core box;

FIGS. 5 and 6 are top and bottom views of the core box when provided with the resilient pressing pads;

FIG. 7 is a sectional view taken along line 7—7 of FIG. 6;

FIG. 8 is a side view of a second embodiment of the apparatus;

Figure 9:
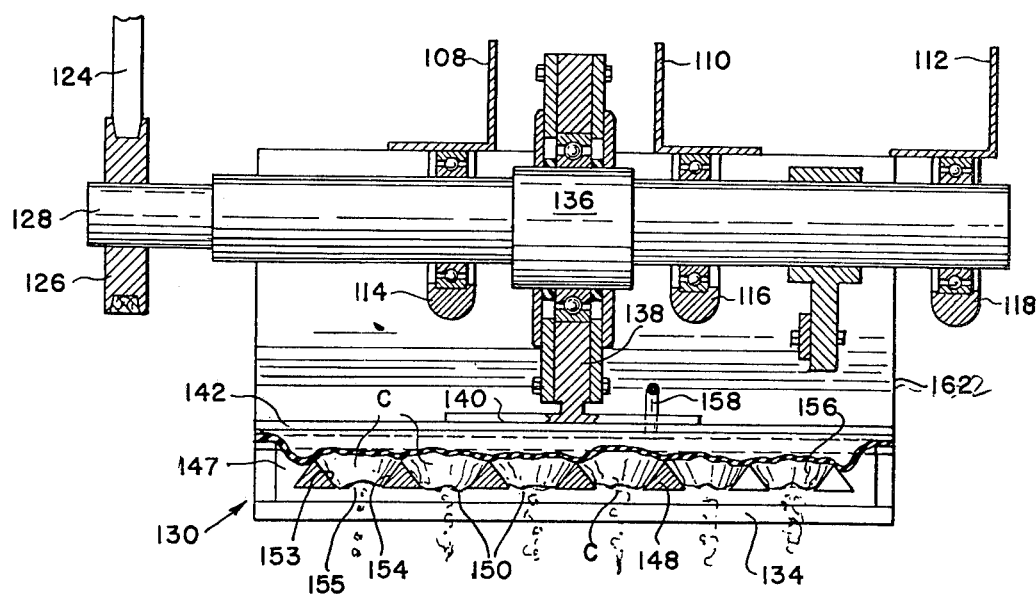
FIG. 9 is an enlarged sectional view taken along lines 9—9 of FIG. 8.

Referring first more particularly to FIGS. 1 and 2, the vibratory crab body processing apparatus includes a stationary frame 2 having upper horizontal runners 4 which support a pair of vertical stanchions 6 that are connected by horizontal transverse members 8. Journalled between the stanchions is an upper shaft 10 to which are connected a driven pulley 12 and a driving pulley 14, which shaft is driven by motor 16 secured to the frame, a drive pulley on the motor shaft, and endless belt 18. Also connected between the stanchions are a pair of parallel spaced rods 20, 22 to which are pivotally connected at their upper ends pairs of arms 24, 26 respectively, which arms rotatably support at their lower ends a pair of shafts 28, 30 on which are carried tension pulleys 32 and 34, respectively.

Referring now to FIG. 3, an endless belt 36 mounted on pulleys 14, 32 and 34 is mounted also on eccentric drive pulley 38 mounted on shaft 40 which carries eccentric weight members 42. Eccentric shaft 40 is journalled at opposite ends in spaced vertical side plates 44 that extend upwardly from the opposite sides of the central portion of core box holder 46. The core box holder comprises a pair of parallel spaced opposed horizontal channel members 48 (FIGS. 3 and 7) that extend longitudinally above the upper frame runners 4. The core box holder, which includes transverse channels 50, is resiliently connected at opposite ends with the frame 2 by pairs of support springs 52 and 54, respectively. Four lateral springs 56 connected between the core box holder 46 and the frame 2 stabilize the core box holder against lateral movement. Consequently, the springs 52, 54 and 56 support the core box holder primarily for vertical and longitudinal movement relative to the frame. Connected between the frame and the lower ends of pivot arms 24 and 26 are tension springs 60, 62 which bias the pivot arms outwardly to cause pulleys 32 and 34 to tension the endless belt 36, whereby upon driving of the eccentric shaft 40 by motor 16 vibratory motion is imparted to the spring-suspended core box holder 46.

Referring now to FIGS. 4-7, a core box assembly 70 is illustrated that includes an open-topped tray-shaped core box 72 having side and end walls 74 and 76, respectively, and a bottom wall 78 that contains a plurality of discharge openings 80. The bottom wall is configured to define frustoconical or frustopyramidical pockets 78a that converge toward the discharge openings 80. The size of the discharge openings 80 is slightly smaller than that of the core portion of a cooked crab body that has been de-shelled, de-legged and de-fingered and the central cavity of which is cleaned. As shown in FIGS. 4 and 7, the crab cores are placed in the pockets 78 with their cleaned cavities directed toward the discharge openings 8. Resilient pads 84 formed of a suitable compressible material (such as a synthetic plastic foam material) are mounted in the pockets and are pressed downwardly to bias the crab cores against the bottom wall 78 by the inverted tray-shaped cover member 86 having downwardly depending side and end walls. As shown in FIG. 7, the core box assembly 70 is adapted for sliding insertion between the U-shaped channel members 48 of the core box holder, the dimensions of the components being such that the cover is tightly seated on the core box with the resilient pads compressed therebetween. Owing to the connection between the core box and the holder therefor, the core box is shaken simultaneously with the holder by the eccentric means 42, whereupon edible crab meat particles are vibrated from the crab cores and are deposited by gravity upon the upper run of endless conveyor means 90 that travels beneath the core box holder. Preferably, the range of vibration of the core box assembly is about 1500 to 5000 vibrations per minute, which vibration range produces effective removal of the crab meat from the core without damage to the edible meat.

Figure 10:
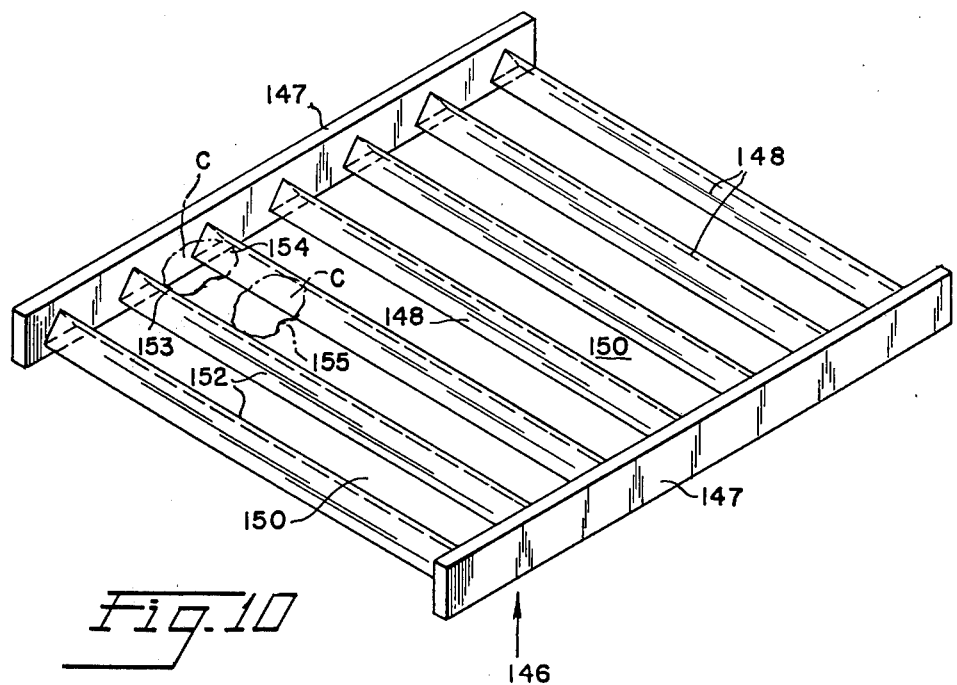
FIG. 10 is a perspective view of the core box shown in FIG. 9.

Referring now to FIGS. 8-10 illustrating the second embodiment of the invention, here again, the prepared crab bodies are vibrated within the range of 1500 to 5000 vibrations per minute by eccentric means to shake the crab meat from the crab core and deposit the meat on a traveling conveyor for easy removal.

More particularly, see FIGS. 8 and 9, a frame 100 is provided with members 102, 104 and 106, three angle members 108, 110 and 112 being carried by member 106 and adapted to support bearings 114, 116 and 118. An electric motor 120 is provided with a driving pulley 122 for rotating, through a belt 124, a driven pulley 126 fixed to the outer end of a driven shaft 128, the latter being rotatably mounted in the bearings 114, 116 and 118.

A core box holder 130 includes a pair of opposed and spaced apart channel members 132 and 134 and is adapted to be vibrated within the range of 1500 to 5000 vibrations per minute by means of an eccentric 136 formed on or secured to the shaft 128. As shown, an eccentric strap 138 surrounds the eccentric 136 and carries a supporting plate 140 which is connected with a cover plate 142 by means of a plurality of bolts 144. Cover plate 142 overlies the channel members 132 and 134 and is secured to the latter in any suitable manner. With the construction just described, it will be appreciated that when the shaft 128 and eccentric 136 are rotated, the core box holder 130 will be vibrated at a speed depending on the speed of rotation of the shaft 128.

Referring now to FIGS. 9 and 10, a core box assembly is illustrated therein as including an open-topped, tray-shaped core box 146 having side rails, 147 interconnected by a plurality of spaced-apart crab-supporting rails or bars 148, the spacing between the rails 148 defining discharge openings 150, the spacing being slightly less than the width of the core portion C of a cooked crab that has been de-shelled, de-legged and de-fingered, and the central cavity of which has been cleaned. As shown, the crab cores are positioned in rows between adjacent bars 148, it being pointed out that the sides 152 of the bars converge downwardly toward the discharge openings 150 and are angularly directed to engage the bony structure of the sides of the crab cores. Thus, as shown in FIG. 9, the sides 153 and 154 of the crab core closely engage the sides 152 of the rails 148, the sides of the body meaning the opposite portions where the legs were attached. As shown, crab cores C are positioned in an inverted position with the bottoms of the crab uppermost and with the cleaned cavities and the mouth portions 155 directed downwardly and aligned with the discharge openings 150.

In order to firmly and resiliently hold the crab cores C in position during vibration thereof, a pneumatic cushion 156 is positioned beneath cover plate 142, the opposite edges thereof being secured to the members 132 and 134. Compressed air may be admitted to the cushion 156 through a flexible hose connection 158 whereupon the cushion will resiliently hold the crab cores in position as shown in FIG. 9 during vibration of the core box.

In operation, the core box 146 is loaded with a plurality of rows of crab body cores C, the cores being positioned between the rails as heretofore pointed out, that is, with the sides 153 and 154 of the bodies contacting the sides 152 of the rails 148 and with the cores being slightly spaced-apart and with the cleaned cavities and mouth portions 155 in line with the discharge openings 150. The core box is then slid along to the channel members 132 and 134 of the holder 130 to the position shown in FIG. 9 whereupon the cushion 156 is inflated to hold the crab cores in position. The shaft 128 is then rotated to vibrate the core box within the range 1500 to 5000 vibrations per minute through the eccentric 136 and the eccentric strap 138. During this operation, the core box will be vibrated in a vertical direction normal to the shaft 128 and the vibration will also include a horizontal component laterally of the shaft 128. In order to stabilize the core box holder during vibration thereof, a pair of sheets 160, 162 of rubbery material such as Neoprene, for example, are provided on opposite sides of the core box 130, see FIG. 8, the upper edges of the sheets being secured to the frame member 106 at 164 and 166 and the lower edges being attached to the core box in any suitable manner. As the core box 146 and crab cores C are vibrated, the edible crab meat will be separated from the bony shell structure and deposited on the conveyor 168 for subsequent removal and packing. During the vibration of the crab cores, the edible meat will be shaken out of the crab bodies through the cleaned cavities and mouth portions 155 and it has been found in practice that the separated meat contains little or no shell or shell fragments and breakage of the choice larger portions such as the lump meat is minimized.

While the invention has been shown and described herein with considerable particularity it will be understood that various modifications may be made without departing from the spirit of the invention. Reference will therefore be had to the appended claims for a definition of the limits of the invention.

What is claimed is:

1. The method of removing edible particles of crab meat from the core of a crab body which has been cooked, de-shelled, de-legged and defingered and the body cavity of which has been cleaned out which comprises supporting the sides of an inverted crab core with the body cavity directed downwardly while resiliently pressing downwardly on the uppermost portion of the core, and vibrating the supported core in the range of 1500 to 5000 vibrations per minute to thoroughly remove the edible crab meat from the crab core.

2. The method of removing edible particles of crab meat from the core of a crab body which has been cooked, de-shelled, de-legged, and de-fingered and the body cavity of which has been cleaned out which comprises supporting the sides of an inverted crab core in a core box with the body cavity directed downwardly while pneumatically pressing downwardly on the uppermost portion of the core, and vibrating the supported core in the range of 1500 to 5000 vibrations per minute to thoroughly remove the edible crab meat from the crab core while maintaining the crab body in the same relative position to the core box during vibration.

* * * * *